(12) United States Patent
Prestaux et al.

(10) Patent No.: US 10,934,202 B2
(45) Date of Patent: Mar. 2, 2021

(54) METHOD FOR PRODUCING GLASS BOTTLES BY AUTOMATIC FORMING AND APPARATUS TO CARRY OUT THE METHOD

(71) Applicant: VERRERIES BROSSE S.A.S., Vieux Rouen sur Bresle (FR)

(72) Inventors: Denis Prestaux, Pierrecourt (FR); Mathieu Brasseur, Le Translay (FR); Laurent Villa, Aumale (FR); Laurent Santarelli, Aumale (FR)

( * ) Notice: Subject to any disclaimer, the term of this patent is extended or adjusted under 35 U.S.C. 154(b) by 415 days.

(21) Appl. No.: 15/761,420

(22) PCT Filed: Oct. 17, 2016

(86) PCT No.: PCT/IB2016/056208
§ 371 (c)(1),
(2) Date: Mar. 19, 2018

(87) PCT Pub. No.: WO2017/068480
PCT Pub. Date: Apr. 27, 2017

(65) Prior Publication Data
US 2020/0231485 A1    Jul. 23, 2020

(30) Foreign Application Priority Data

Oct. 19, 2015    (IT) .......................... UB2015A005129

(51) Int. Cl.
*C03B 9/193*    (2006.01)
*C03B 9/34*    (2006.01)
(Continued)

(52) U.S. Cl.
CPC ............ *C03B 9/1932* (2013.01); *C03B 9/342* (2013.01); *C03B 9/347* (2013.01); *C03B 9/3645* (2013.01); *C03B 9/3654* (2013.01); *C03B 9/3672* (2013.01)

(58) Field of Classification Search
CPC ....... C03B 9/1932; C03B 9/342; C03B 9/347; C03B 9/364; C03B 9/3654; C03B 9/3663; C03B 9/3672; C03B 9/3681
See application file for complete search history.

(56) References Cited

U.S. PATENT DOCUMENTS

| | | | | |
|---|---|---|---|---|
| 1,127,381 | A | * | 2/1915 | Byrnes .................. C03B 9/1932 65/80 |
| 2,402,234 | A | * | 6/1946 | Berthold ................. C03B 9/165 65/76 |
| 4,708,730 | A | * | 11/1987 | Ziegler ................. C03B 9/3609 65/114 |

FOREIGN PATENT DOCUMENTS

| | | |
|---|---|---|
| EP | 0263409 | 4/1988 |
| EP | 1108687 | 6/2001 |

(Continued)

*Primary Examiner* — Lisa L Herring
(74) *Attorney, Agent, or Firm* — Themis Law

(57) ABSTRACT

A process for producing glass bottles with shoulders includes a preform preparation step and a finishing step, in which a compressed gas is blown and the preform is rotated by 180° between the preform mold and the finishing mould. Preform preparation is achieved by introducing a glass gob into the mold through an upper aperture; inserting a blowing sleeve into the glass gob, the end of the sleeve extending beyond the shoulders of the outline of the preform of the bottle, the sleeve being closed by a plunger element slidable within its interior; opening the cavity of the sleeve to disengage the plunger element; and blowing air through the sleeve, wherein the final finishing step is achieved in an open preform mold, the volume of the cavity of the finishing mold being greater than the volume of the cavity of the preform mold by 5-20%.

3 Claims, 8 Drawing Sheets

(51) Int. Cl.
*C03B 9/347* (2006.01)
*C03B 9/36* (2006.01)

(56) References Cited

FOREIGN PATENT DOCUMENTS

| EP | 2409958 | 1/2012 |
| FR | 457206 | 9/1913 |
| GB | 377408 | 7/1932 |
| GB | 404308 | 12/1933 |

* cited by examiner

METHOD FOR PRODUCING GLASS BOTTLES BY AUTOMATIC FORMING AND APPARATUS TO CARRY OUT THE METHOD

FIELD OF THE INVENTION

The present invention relates to a method for producing glass bottles by automatic forming, and an apparatus for carrying out the method.

SUMMARY OF THE INVENTION

An object of the invention is to produce a glass bottle having a large mass relative to the bottle capacity while at the same time having a significant glass thickness at the shoulders, at the base and on the vertical faces.

Another object of the invention is to produce a bottle intended for the luxury perfume or any other perfume sector, or for the cosmetics or food sector.

Another object of the invention is to produce a bottle in which the ratio of its weight to its capacity is within the range of 3-6.

These objects are attained according to the invention by a method for producing glass bottles as described hereinafter.

BRIEF DESCRIPTION OF THE DRAWINGS

The present invention is further clarified in terms of a preferred embodiment thereof, provided by way of non-limiting example with reference to the accompanying drawings, in which.

DETAILED DESCRIPTION OF EMBODIMENTS OF THE INVENTION

Figure 1:
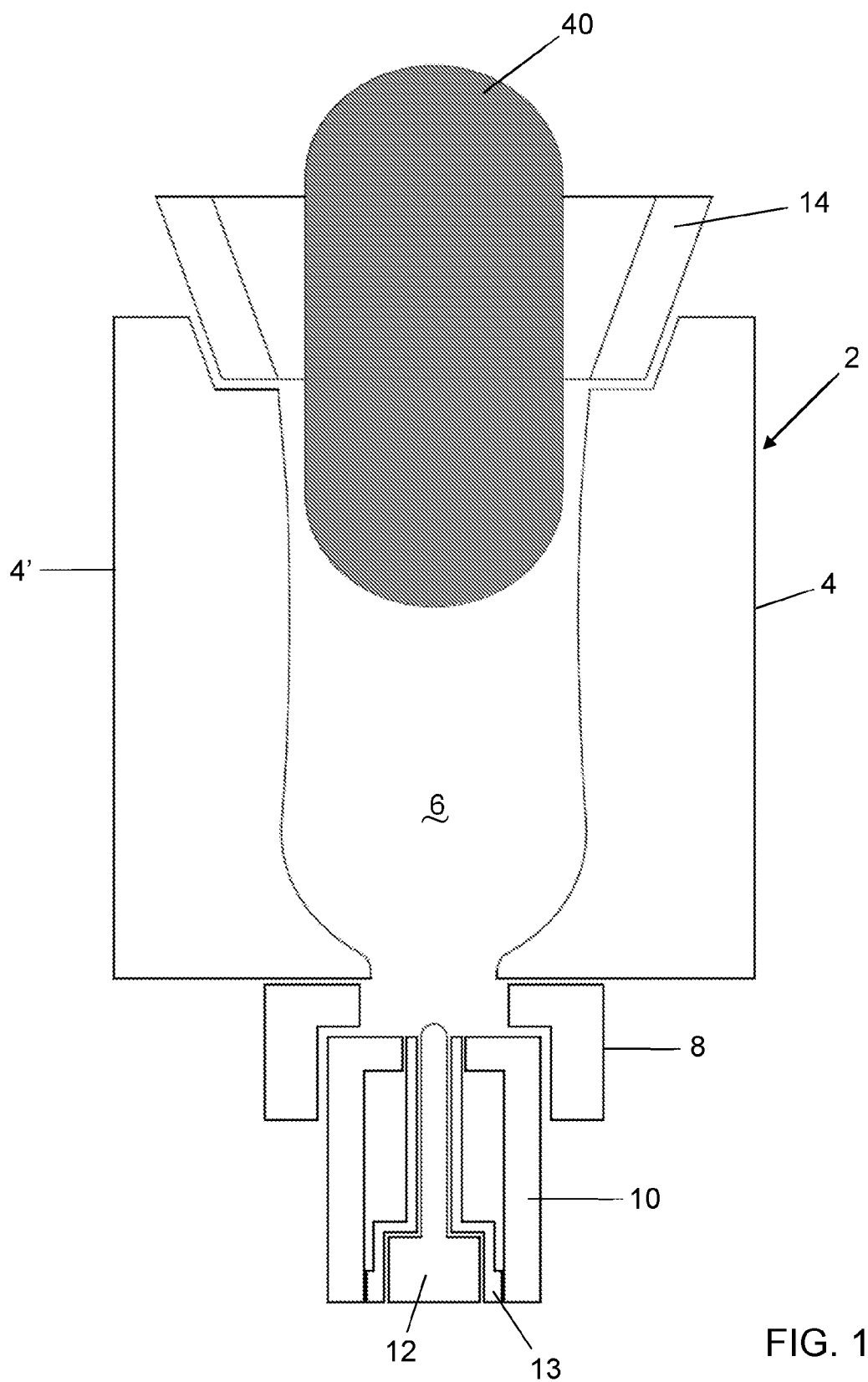
FIGS. 1, 2 and 3 show the preform mold during the different steps in the preform preparation.

As can be seen from the figures, the method for producing the glass bottle requires the use of a preform mold indicated overall by 2, consisting of two half-shells 4, 4' which are hinged together but are also able to undergo horizontal parallel movement, such that when closed together form a cavity 6 open upperly and lowerly.

The lower aperture of the two half-shells 4, 4' is closable, during the glass preform formation step, by another collar 8, also composed of two halves, intended to give the final shape to the mouth, but not exclusively thereto, in which a lining 10 is positioned for guiding a movable plunger 12 housed within a guide accessory 13.

During the preform formation step, a funnel 14 can be inserted into the top of the cavity 6, and be closed by a stopper 16. The collar 8 is mounted on an arm 20 of a device 27 rotatable about a horizontal axis 22.

Figure 4:
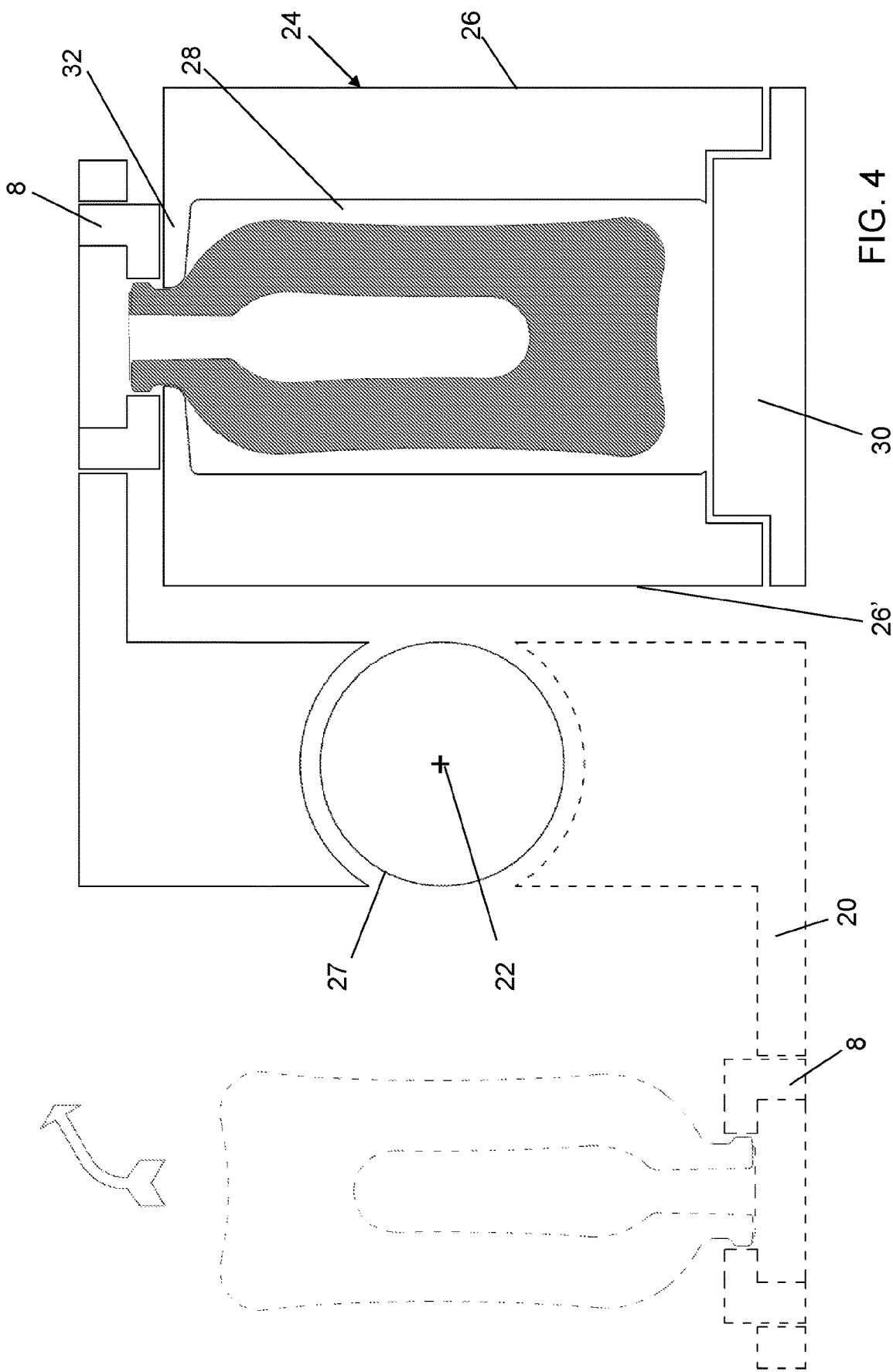
FIG. 4 shows the step of transferring the glass preform from the preform mold and overturning it into the finishing mold.
Figure 5:
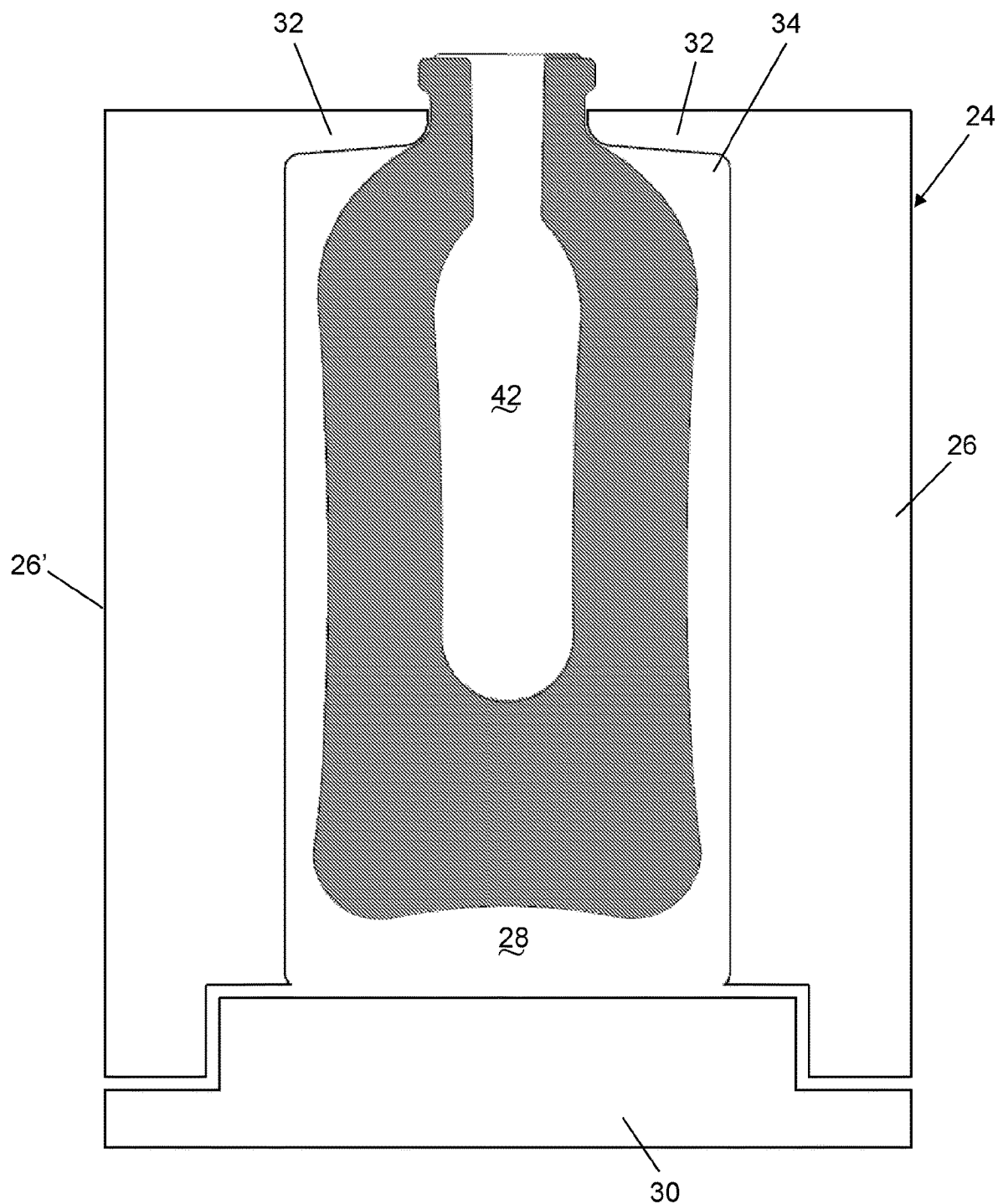
FIGS. 5, 6 and 7 show the finishing mold during the different steps of the forming cycle.
Figure 6:
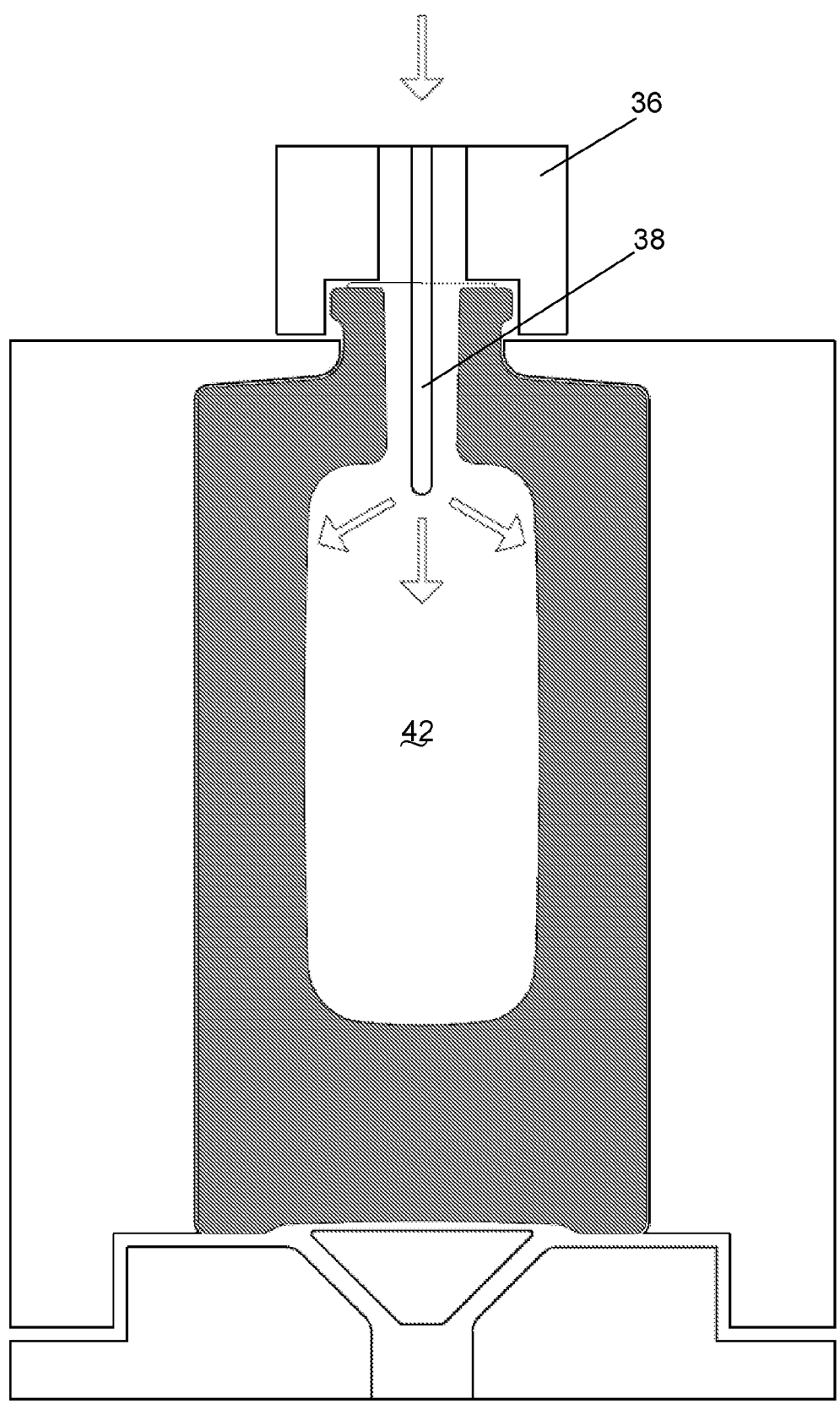
Figure 7:
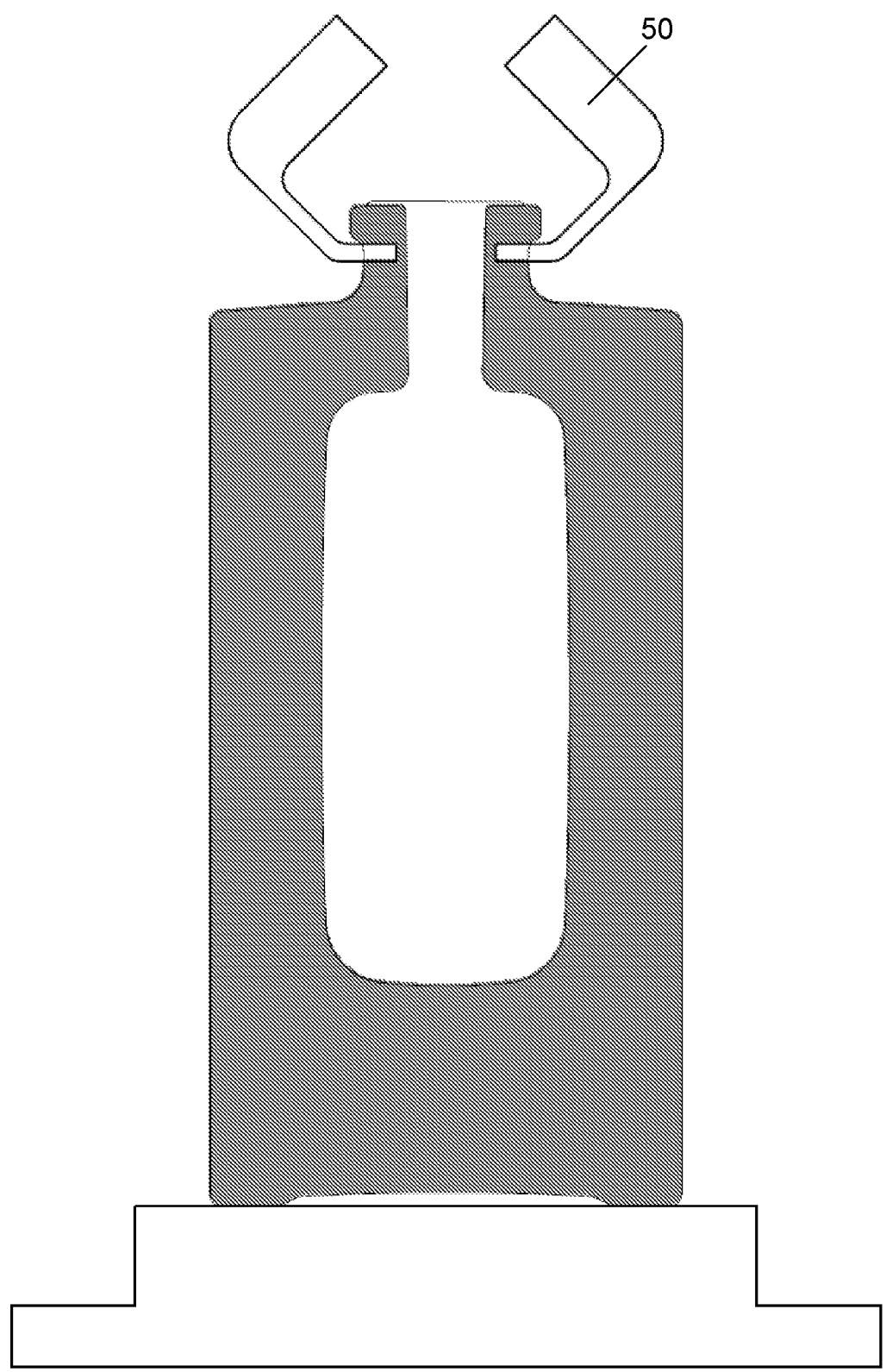
Figure 8:
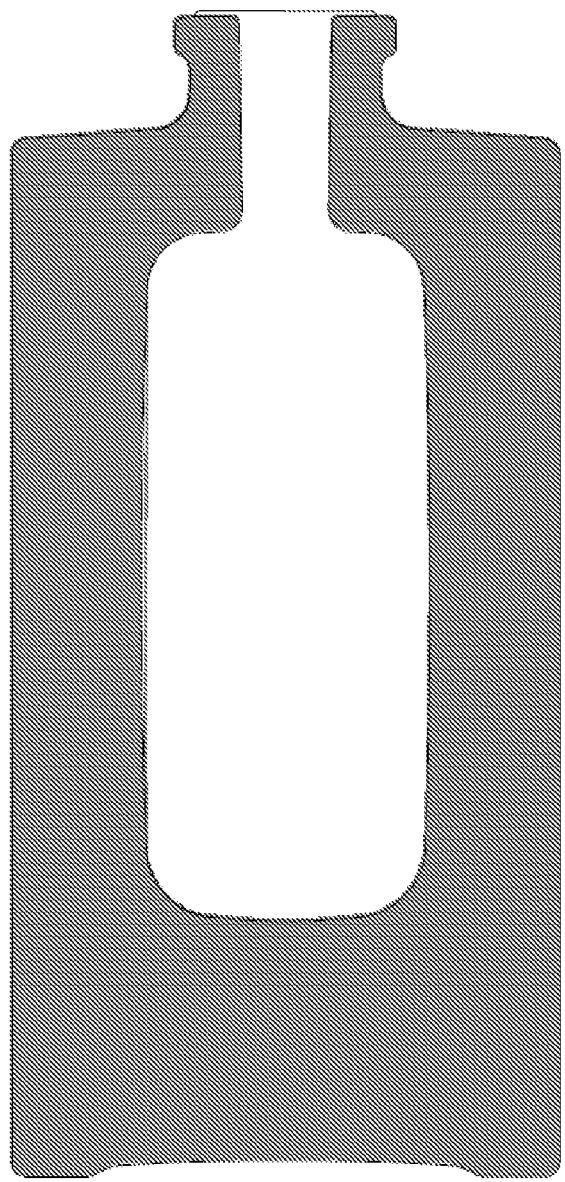
FIG. 8 shows a bottle obtained by the process.

Said rotation device 27 transfers the glass preform, obtained in the first step of the production process, to the mold which gives the bottle its final shape. For this purpose, a finishing mold 24 is provided (see FIGS. 4, 5 and 6) consisting of two half-shells 26, 26' which when together form a cavity 28, the volume of said cavity being greater than the volume of the cavity 6 of the preform mold by a percentage between 5% and 20%.

The cavity 28 is closed lowerly by a plug 30 forming the base of the finishing mold; the two half-shells 26, 26' (forming part of the finishing mold) are subjected to hinge-type movement or parallel movement and, when closed, they form together with the parts 32 a hole of generally circular shape which supports the preform within the cavity 28 when the preform is released by the collar 8.

In particular, by this method, the hole within the mouth is obtained with dimensional and tolerance characteristics such as not to require any subsequent sizing work with machine tools.

A blowing head 36 housing a pipe 38 used during the bottle forming step is positioned above the finishing mold.

In detail, the bottle is produced by the following procedure: with the half-shells 4, 4' in mutual contact, a glass gob 40 (for example, but not exclusively, of soda-lime glass) is introduced at a temperature of 1100° C.-1250° C. into the cavity 6. In particular, FIG. 1 shows the glass gob 40, which is obtained by an external mechanism known as a feeder, which determines a shape and weight for the gob equivalent to that of the bottle which is to be produced. This gob is transferred by the feeder, positioned above the molds, to the machine preform mold via straight or curved open guide channels, and guided exactly to the center of the two closed half-shells 4, 4' by a funnel 14.

Figure 2:
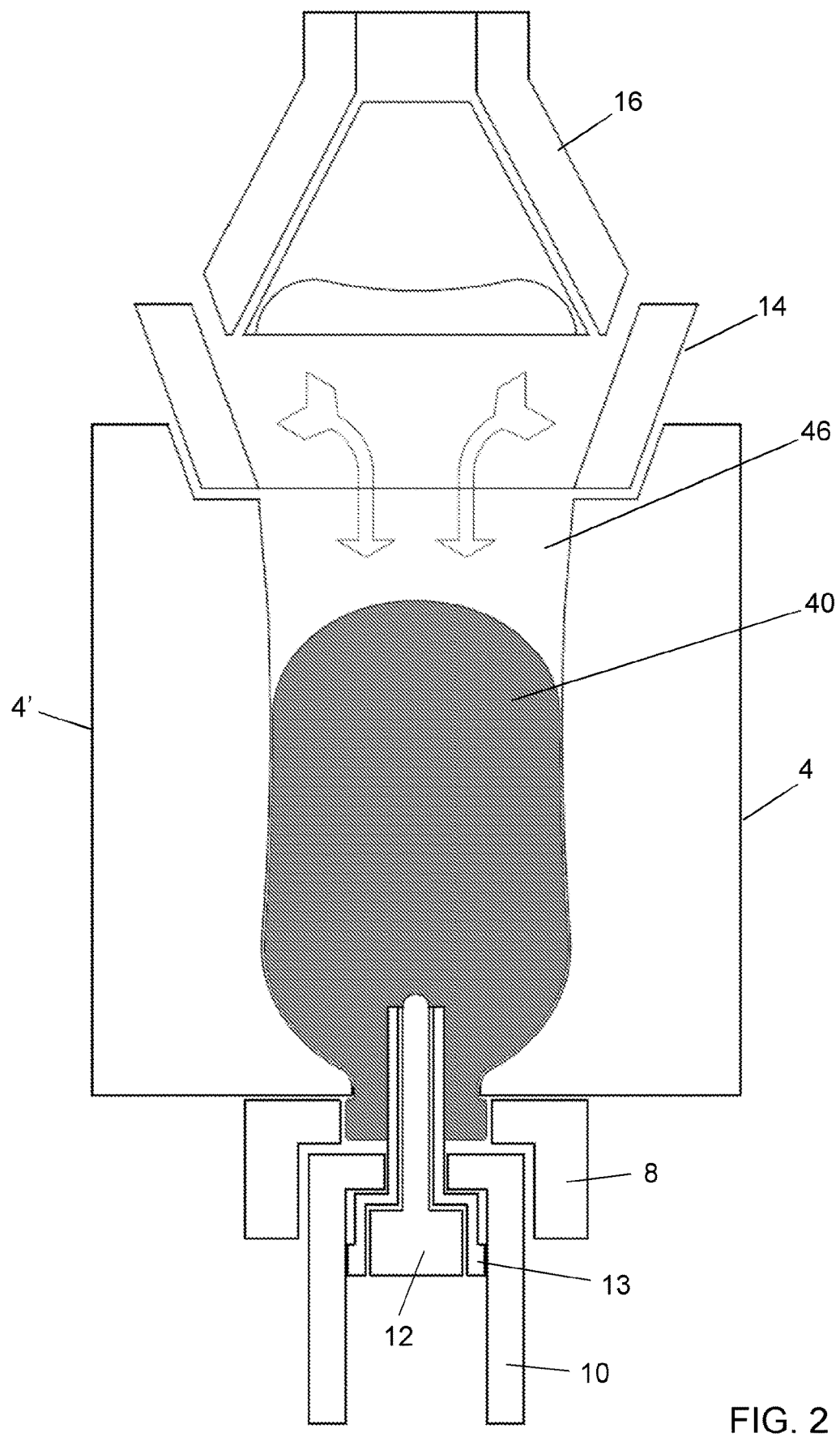

After loading the gob into the preform mold from above, a gob compression step is carried out by means of compressed air in a downward direction. During this step the glass, still in a soft condition, assumes the external profile of the cavity, to form the mouth in both its final outer and inner shape. During this step the plunger mechanism and its accessories are in the high position (see FIG. 2).

Figure 3:
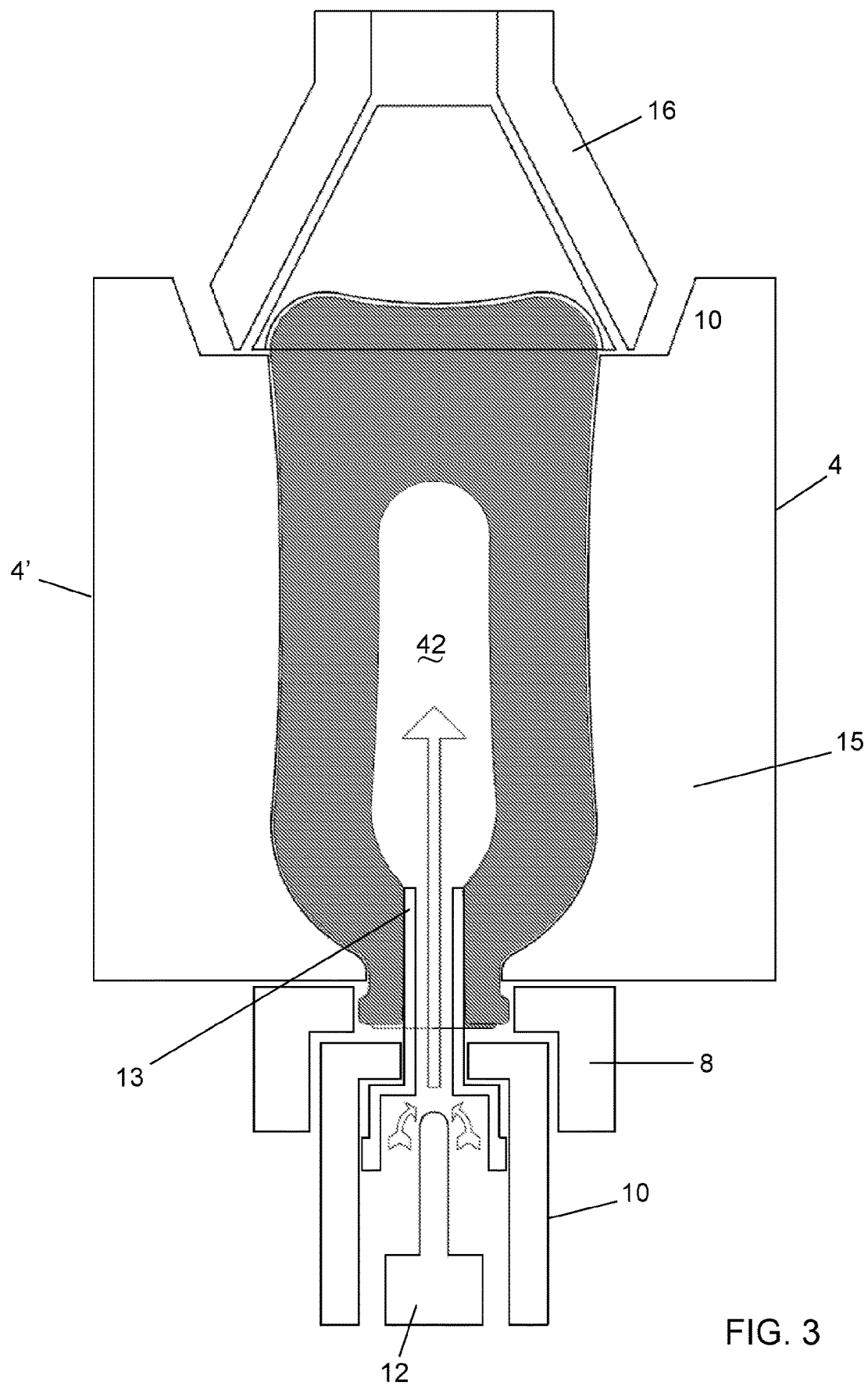

FIG. 3 shows the next step in the process, in which the stopper 16 is positioned directly on the top of the preform mold to close the top of the two half-shells 4, 4'. The movable plunger 12 is then made to descend. Air is then blown in through the guide accessory 13, this air forming the inner cavity 42 of the preform and distributing the glass within the cavity 6, bounded upperly by the stopper 16.

The specific use of the plunger and its accessories enable a container preform to be obtained during the first forming step having a large thickness at the shoulder.

The two half-shells 4, 4' are opened and the collar 8 with the bottle constrained to it is then rotated through 180° by the device 27 about the axis 22, such as to position the formed bottle between the two half-shells 26, 26' (open in this configuration) of the finishing mold 24.

The two half-shells are then brought into mutual contact such that the upper horizontal projections 32 retain the bottle neck. The blowing head 36 is then lowered such that a pipe portion 38, rigid with it, enables compressed air to be injected into the cavity 42 formed within the vitreous mass, in order to further inflate it and cause the vitreous mass to adhere to the walls of the half-shells of the finishing mold. On termination of this operation, the blowing head is removed, then after opening the two half-shells, the bottle, representing the product to be obtained, is extracted by suitable tweezers 50.

From the aforegoing it is apparent that the process according to the invention presents numerous advantages and in particular:

it enables glass bottles or containers to be produced by automatic forming machines for the luxury perfume, cosmetics and general perfume sectors and for the liqueur and food sectors, it enables the outer dimensions of the preform (length, width and height for a square or rectangular bottle and the diameter and height for a cylindrical bottle) to be greater by 80% than the dimensions of the bottle which is to be obtained, it enables bottles to be obtained having a ratio of weight to capacity within a range between 3 and 6, it enables bottles to be obtained in which the glass thickness even in the top part of the bottle (known as the shoulder) is large and particularly apparent, as the inner cavity extends broadly below the outer shoulder connection line, it enables bottles with flat faces to be produced: in particularly the planarity of the faces easily falls within the commercially defined limits, without the need to use specific dishing of the finishing molds or for subsequent bottle grinding operations.

Moreover this type of process, described for production using a single gob during the production step, is also applicable if the said automatic machine is fed in parallel with two, three or four gobs. The process can hence be applied to forming machines having any distance between the cavity axes.

The invention claimed is:

1. A process for producing glass bottles with shoulders, in accordance with a cavity forming method comprising a preform preparation step and a finishing step, with blowing by compressed air or other gas, and 180° rotation of a preform between a preform mold and a finishing mold, wherein the preform preparation step is achieved by:
a) introducing a glass gob into the preform mold through an upper aperture;
b) from a base of the preform mold, inserting a blowing sleeve into the glass gob deposited on a base of a preform mold cavity, an end of said blowing sleeve extending beyond shoulders of an outline of the preform of a bottle produced in the finishing mold, said blowing sleeve being closed by a plunger slidable within an interior of said blowing sleeve;
c) opening a cavity of the blowing sleeve to disengage the plunger; and
d) blowing air through said blowing sleeve, wherein a final finishing step is achieved in an open preform mold operating as the finishing mold with a blowing head provided with a blowing tube, a volume of a cavity of said finishing mold being greater than a volume of the preform mold cavity of the preform mold by 5-20%.

2. The method as claimed in claim 1, wherein introducing the glass gob comprises introducing the glass gob into an interior of the preform mold through a funnel closable by a stopper.

3. An apparatus for implementing the process claimed in claim 1, comprising:
the preform mold adapted to be loaded from above with the glass gob, said preform mold having two openable half-shells defining a lower aperture in the preform mold cavity;
a collar for closing the lower aperture of the preform mold cavity;
a lining housed within the collar for guiding the plunger housed within a guide accessory forming the blowing sleeve, said guide accessory having a length greater than a height of the shoulders of the outline of the preform of the bottle to be produced, said guide accessory being inserted into the glass gob when the glass gob is deposited onto the base of the preform mold cavity closed by the collar;
a funnel insertable into the preform mold closable by a stopper;
the finishing mold having two openable half-shells which form a second cavity, a volume of said second cavity being greater than a volume of the preform mold cavity of the preform mold by a percentage between 5 and 20%;
a blowing device positioned above said finishing mold and having a terminal part of a length in relation to a glass thickness of the shoulder; and
a rotatable arm which transfers a bottle preform formed in the preform mold into the finishing mold.

* * * * *